May 28, 1968  R. L. COLLINS  3,385,411
CENTRIFUGAL CLUTCH ACTUATOR AND SPRING RETAINER
Filed Aug. 30, 1966

INVENTOR
ROBERT L. COLLINS
BY Burns, Doane, Benedict, Swecker & Mathis
ATTORNEYS United States Patent Office 3,385,411
Patented May 28, 1968

3,385,411
CENTRIFUGAL CLUTCH ACTUATOR AND
SPRING RETAINER
Robert Lawrence Collins, Inglewood, Calif., assignor to McCulloch Corporation, Los Angeles, Calif., a corporation of Wisconsin
Filed Aug. 30, 1966, Ser. No. 576,124
7 Claims. (Cl. 192—89)

ABSTRACT OF THE DISCLOSURE

A centrifugal clutch including a free-floating sheet-metal member mounted within the clutch shoe restraining spring and operable to limit spring deflection in response to centrifugal force acting on the spring. Cams are provided on the ends of the member whereby centrifugal forces acting on the spring and member will assist in engaging the clutch.

GENERAL BACKGROUND OF INVENTION

This invention relates to a clutch spring retaining device. In particular, it pertains to a one-piece, sheet metal member which may be effectively employed to prevent a clutch shoe tensioning spring of a centrifugal clutch from moving outwardly under the influence of centrifugal force into abrading engagement with a driven member.

Centrifugal clutches have long been utilized as force transmitting devices. Particularly in recent years, these clutches have been employed as speed responsive drive mechanisms in devices such as portable chain saws. Their incorporation in such devices insures that a relatively small driving engine achieves a desired operating speed before being subjected to the load of a working device such as a driven cutter chain.

Conventional centrifugal clutches have included a drive shaft supporting a clutch assembly. This clutch assembly has often included a pair of drive shoes disposed on opposite sides of a drive shaft and biased toward the drive shaft by interposed tensioning springs. In general, a pair of tensioning springs have been employed on opposite sides of a drive shaft so as to urge corresponding ends of diametrically opposed clutch shoes toward each other.

In practice it has been found that in such clutches, under the ranges of speed through which they operate, sufficient centrifugal force is exerted on the clutch shoe restraining coil springs to cause these springs to translate radially outwardly into abrading engagement with a driven cylindrical member. As will be appreciated, this abrasion occurs during the period of time while the clutch assembly is attaining a full operating speed and before the clutch shoes have moved into full clutching engagement with the driven member. During this period of operation, the coil springs of the clutch, along with the clutch shoes, undergo high-speed rotary movement relative to the driven member. Thus, with the coil springs thrown outwardly into engagement with the driven member and being rotated relative to the member, substantial abrasion has occurred which in time has caused breakage of the coil springs. Further, the deflection of the coil springs, in response to centrifugal force, has tended to pull the clutch shoes out of engaging relation with a driven member and thereby slowed the response time of the clutches.

OBJECTS AND SUMMARY OF INVENTION

It is an object of the present invention to provide an improved centrifugal clutch including a unique, coil spring retaining member which prevents tensioned coil springs from moving outwardly into abrading engagement with a driven member and which is disposed in stabilizing, slidable engagement with clutch shoe means.

It is a further object of the invention to provide such a spring retaining device which functions as a centrifugally responsive clutch shoe wedge and enables centrifugal force exerted on coil springs to be transferred through the retaining members to the clutch shoes restrained by the springs so as to augment the centrifugal force exerted on the clutch shoes.

It is a further object of the invention to provide such a retaining device which is self-centering in character and which, because of its unique structure, is prevented from undergoing skewing movement within the coil spring which it restrains.

It is a further object of the invention to provide such a spring retaining device which may be readily incorporated in existing centrifugal clutches without requiring structural modifications and which may be installed without being immovably secured relative to either the coil springs or clutch shoes of a centrifugal clutch.

It is also an object of the invention to improve the response time and clutching characteristics of a centrifugal clutch by minimizing or preventing a centrifugally induced deflection of its coil springs.

In order to accomplish some of the foregoing objects, there is presented through the invention, a clutch spring retaining device including means for engaging the inside of a coil spring of a clutch to restrain the spring against movement laterally of its axis. The device also includes means for slidably engaging a clutch shoe engaged by the coil spring to slidably support one end of the device.

In the preferred form of the invention the clutch spring retaining device comprises centering means for engaging the inside of a coil spring of a clutch to restrain the spring against movement in one direction laterally of its longitudinal axis and prevent skewing movement of the device relative to the coil spring in a direction transverse to the one direction. This preferred embodiment further includes cam means for slidably and cammingly engaging clutch shoe means of the clutch at each of opposite ends of the centering means.

An independently significant facet of the invention resides in the clutch shoe wedging structure which results from a pair of oppositely directed cam means carried by the retaining device.

DRAWINGS OF PREFERRED EMBODIMENT

In describing the invention, reference will be made to a preferred embodiment shown in the appended drawings.

OVERALL CLUTCH STRUCTURE

Figure 1:
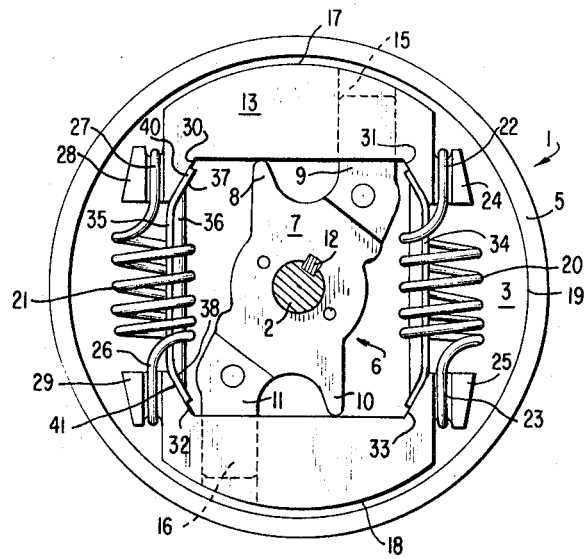
FIGURE 1 is an end view of the exposed components of a centrifugal clutch illustrating relations between a drive shaft, a clutch assembly, and a driven member which is centrifugally actuated by the clutch assembly.
Figure 2:
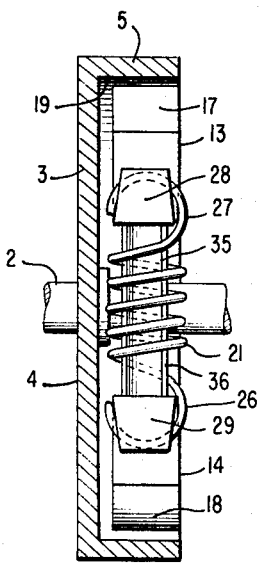
FIGURE 2 is a fragmentary, transverse, partially sectioned view of the FIGURE 1 assembly with the driven member shown in section and the drive shaft and clutch assembly shown in elevation.
Figure 3:
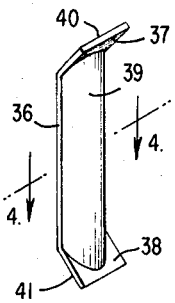
FIGURE 3 is a perspective view of one of the two, one-piece, sheet metal, coil spring retaining devices included in the FIGURE 1 apparatus.
Figure 4:
FIGURE 4 is a transverse sectional view of a restraining device as viewed along the section line 4—4 of FIGURE 3.

As shown in FIGURES 1 and 2, the clutch 1 of the present invention includes a drive shaft 2, extending from a conventional engine or motor, not shown, and a driven member 3. Driven member 3 comprises a wall 4 supported for free revolution on the shaft 2 and extending radially of the shaft, and a cylindrical wall portion 5 disposed in coaxial alignment with the longitudinal axis of the shaft 2.

Driven member 3 may carry a sprocket wheel, not shown, by means of which the rotary motion of the driven member 4 is transmitted to a cutter bearing chain of a portable chain saw.

Clutch 1 includes a clutch assembly 6 mounted on and rotatable with the drive shaft 2. Clutch assembly 6 includes a base member 7 including a first shoe support 8 and a first shoe guiding finger 9 disposed on one side of the drive shaft 2 and a second shoe support 10 and second shoe guiding finger 11 disposed on the opposite side of the shaft 2. Base member 7 is keyed to shaft 2 by a conventional key 12 as generally shown in FIGURE 1.

Clutch assembly 6 includes a pair of clutch shoes 13 and 14 supported on opposite sides of shaft 2 by assembly base 7.

As shown in FIGURE 1, shoe 13 includes a recess 15, with guide finger 9 being slidably disposed within the recess 15. Guide finger 9 as well as recess 15 may have polygonal cross-sectional configurations with guide finger 9 being closely dimensioned so as to confine the shoe 13 to essentially non-rotary, slidable movement relative to the finger 9. In its radially innermost position relative to the shaft 2, shoe 13 rests upon shoe support or abutment 8.

Similarly, shoe 14 includes a guide recess 16 which slidably receives the guide finger 11. As previously noted in connection with guide recess 15 and guide finger 9, recess 16 and finger 11 may have polygonal cross-sectional configurations and be in essentially mating engagement such that the finger 11 guides the shoe 14 for radially inward or outward movement relative to the shaft 2. In its innermost radial position, shoe 14 is supported on support member or abutment 10.

As shown in FIGURE 1, shoes 13 and 14 have arcuate, generally cylindrical outer peripheries 17 and 18 which are mateable with the inner periphery 19 of the cylindrical portion 5. In the position of the shoes shown in FIGURE 1, the shoe clutch surfaces 17 and 18 are disposed radially inwardly and out of driving engagement with the cylindrical surface 19. When the rotary shaft 2 attains sufficient speed, the shoes 13 and 14 are thrown radially outwardly under the influence of centrifugal force into clutching or driving engagement with the face 19 of the driven member 4.

As illustrated, shoes 13 and 14 are arranged such that they have a common median plane which intersects and parallels the longitudinal axis of the shaft 2, with each of the shoes being movable in the direction of this plane.

In order to retain the clutch shoes 13 and 14 in the retracted position shown in FIGURE 1, a pair of clutch shoe restaining, helical coil springs 20 and 21 are provided. Coil spring 20 includes conventional hooks 22 and 23 which engage ears 24 and 25 of shoes 13 and 14 respectively so as to urge corresponding ends of these shoes toward each other.

Similarly, coil spring 21 includes hook ends 26 and 27 which engage shoe ears 28 and 29 of shoes 13 and 14 respectively to urge the other corresponding shoe ends toward each other.

Thus, springs 20 and 21 serve to yieldably and elastically restrain shoes 13 and 14 against radial outward movement. Springs 20 and 21 are disposed with their axes parallel and are preferably disposed at equal distances on opposite sides of the shaft 2. The axes of the springs 20 and 21 are parallel to the movement direction of the shoes 13 and 14 relative to the body or base 7.

Thus, coil springs 20 and 21 provide a biasing effect relative to the shoes 13 and 14 which serves to retain these shoes in their retracted position until the drive shaft has attained a rotary velocity sufficient to enable the clutch shoes, under the influence of centrifugal force, to overcome the resilient biasing effect of the coil springs and move radially outward into clutching engagement with the driven member 4.

Each of the shoes 13 and 14 is conventionally provided with a pair of mutually diverging, planar surfaces which face the shaft axis and are parallel to its longitudinal axis. Thus shoe 13 includes planar surfaces 30 and 31 which diverge toward the shoe 14 and away from the shoe 13. Similarly, shoe 14 includes a pair of surfaces 32 and 33 which diverge away from the shoe 14 toward the shoe 13. Each of these surfaces is disposed generally radially within a spring hook retaining ear. Surfaces 30 and 32 are generally aligned with a portion of the interior of the coil spring 21 which is adjacent to the shaft 2. Similarly, surfaces 31 and 33 are generally longitudinally aligned with the portion of the interior of the spring 20 which is adjacent the shaft 2.

COIL SPRING RETAINING DEVICE

Clutch 1 includes a pair of sheet metal coil spring retaining members 34 and 35 respectively. Each of these members is identically configured such that it is necessary to describe the structural details of only one.

Spring retaining member 35 is disposed longitudinally within the interior of coil spring 21 and includes a central, generally cylindrically configured, centering portion 36 and a pair of camming means 37 and 38 disposed at its opposite extremities. These camming means cooperate with the shoe surfaces 30, 31, 32 and 33 so as to functionally transform these surfaces into cams and to provide holding means which yieldably urges the retaining member toward hub 7.

Centering portion 36 includes convex face 39 disposed in nested, curvature conforming engagement with the inside of the spring 21 adjacent the shaft 2. Cylindrical surface 39, which has an arcuate or transverse extent equal to less than half a full cylinder, has a radius of curvature which is substantially the same as half of the inner diameter of the helical coil spring 21. Surface 39 engages all of the coils of its associated spring 21, even when the shoes and coil springs are at rest.

Camming means 37 comprises planar camming surface 40 which is parallel to the axis of the shaft 2 and is disposed in parallel sliding engagement with the camming surface 30. Similarly, camming means 38 comprises a planar camming surface 41 which is parallel with the axis of the shaft 2 and which is disposed in parallel sliding engagement with the camming surface 32. Thus camming surfaces 41 and 40 of spring retaining member 35 engage diametrically opposite camming surfaces 30 and 32 of the shoes 13 and 14 respectively. Camming surfaces 40 and 41 are mutually inclined and diverge away from the concave side of cylindrical segment 36.

The camming surfaces 30 and 32 are disposed generally radially outwardly of their respectively associated camming surfaces 40 and 41 of the retaining member 35.

The camming surfaces 30 and 32 engage the member 35 on its radially outermost side while the coil spring engages the member 35 on its radially innermost side so as to stabilize and secure the member.

With this structural inter-relationship between the retaining member 35, the spring 21, and the shoes 13 and 14, the spring 21 is uniquely stabilized against excessive radial outward movement and the centrifugal force exerted on the shoes 13 and 14 is augmented. As the shaft 2 rotates, centrifugal force acting on the spring 21 is transferred through the member 25 to the camming portions 37 and 38 of this member. These camming portions transfer force to the camming surfaces 30 and 32 of the clutch shoes. The generally oppositely directed slopes of the camming surfaces 30 and 32 enable wedge-like force vectors to be transferred to each of the shoes 13 and 14 which tend to urge these shoes in a radially outward but opposite direction.

The curve conforming engagement between the surface 39 and the interior of the coil spring serves to prevent skewing of the member 35 in a direction parallel to the axis of the shaft 2, i.e., a direction transverse to the direction of radial outward movement of the member 35.

As will be appreciated, the radial outward movement of the member 35 is of a limited extent and governed by the positions of the camming means 37 and 38 on the camming surfaces 30 and 32. At all times the position of these camming portions of the member 35 in engagement with all coils of spring 21 is such as to hold the spring 21 out of engagement with the surface 19 and prevent substantial deflections of the spring midportions.

As will be appreciated, the relation between the retaining member 34, the spring 20 and the camming surfaces 31 and 33, is identical to that described in connection with the member 35 and its associated spring 21 and shoe surfaces 30 and 32. As illustrated, however, members 35 and 34 are disposed in a mirror image or oppositely facing relationship relative to the median plane of the shoes 13 and 14 which intersects and is parallel with the shaft axis.

ADVANTAGES AND SCOPE OF INVENTION

A prime advantage of the invention resides in the unique simplicity of the spring retaining members. They are fabricated as single piece, sheet metal members and installed without resort to securing or fastening devices. Thus no significant alteration of existing clutch structures is necessary, the cost of the retaining members is nominal, and their installation exceedingly simple.

Significantly, the retaining members effectively restrain the coil springs of centrifugal clutches against radial outward movement into abrading and damaging engagement with a driven member which might not only damage the springs but significantly interfere with the effective operation of the clutch.

The ability of the retainer to prevent meaningful deflection of the midportion of the coil spring significantly shortens clutch response time and makes the clutching action more positive and effective.

The unique wedge-like or camming structure of the retaining members enables centrifugal force acting upon the coil springs of the clutch to be transferred at least in part to the clutch shoes so as to augment their holding or gripping action.

Further, the retaining members are self-centering because of their curve conforming engagement with spring interiors, and thus they effectively prevent their own misalignment or skewing during operation of the clutch. Axial displacement of the retaining members out of the desired engagement with their associated coil springs is prevented by the camming engagement of the clutch shoes with opposite ends of the retaining member.

In describing the invention reference has been made to a preferred embodiment. However, those skilled in the clutch art and familiar with the disclosure of the invention may well recognize additions, deletions, substitutions or other modifications which would fall within the purview of the invention as defined in the appended claims.

I claim:

1. A centrifugal clutch comprising:
   a driven, clutch hub;
   a first and a second clutch shoe, each carried by said hub and movable generally outwardly thereof in response to centrifugal force;
   coil spring means extending between and engaging each of said first and second clutch shoes and yieldably urging each of said first and second clutch shoes toward said hub;
   a coil spring retaining device including:
   centering means engaging one side of the inside of said coil spring means, while said coil spring means is at rest, to restrain said coil spring means against movement in one direction laterally of its longitudinal axis and generally outwardly of said hub,
   first mounting means carried at one end of said centering means and slidably engaging said first clutch shoe, said first mounting means being slidable relative to said first clutch shoe in response to centrifugal force induced, outward movement, of said first clutch shoe,
   second mounting means carried at an end of said centering means opposite to said one end and slidably engaging said second clutch shoe, said second mounting means being slidable relative to said second clutch shoe in response to centrifugal force induced, outward movement of said second clutch shoe.

2. A centrifugal clutch comprising:
   a driven, clutch hub;
   a first and a second clutch shoe, each carried by said hub and movable generally outwardly thereof in response to centrifugal force;
   coil spring means extending between and engaging each of said first and second clutch shoes and yieldably urging each of said first and second clutch shoes toward said hub;
   a coil spring retaining device including:
   centering means engaging one side of the inside of said coil spring means to restrain said coil spring means against movement in one direction laterally of its longitudinal axis and generally outwardly of said hub,
   said centering means including arcuate surface means, conformingly engaging a plurality of interior arcuate coil portions of said coil spring means with said interior coil portions being displaced longitudinally of said coil spring means, said arcuate surface means being operable, in response to said conforming engagement with said arcuate coil portions, to prevent skewing movement of said device relative to said coil spring means in a direction transverse of said one direction,
   centrifugally responsive, first cam means carried at one end of said centering means and slidably and cammingly engaging said first clutch shoe, said centrifugally responsive first cam means being movable generally outwardly of said clutch hub in response to centrifugal force and operable, in response to such outward movement, to tend to cam said first clutch shoe generally outwardly of said hub,
   centrifugally responsive, second cam means carried at an end of said centering means opposite to said one end and slidably and cammingly engaging said second clutch shoe, said centrifugally responsive second cam means being movable generally outwardly of said clutch hub in response to centrifugal force and operable, in response to such outward movement, to tend to cam said second clutch shoe outwardly of said hub;
   said arcuate coil portions of said coil spring means being operable to transmit centrifugally induced force acting on said coil spring means to each of said first and second cam means and transmit said centrifugally induced force to each of said first and second cam means through said centering means.

3. A centrifugal clutch comprising:
   a driven, clutch hub;
   a clutch shoe carried by said hub and movable generally outwardly thereof in response to centrifugal force;
   coil spring means engaging said clutch shoe and yieldably urging said clutch shoe toward said hub;
   a coil spring retaining device including:
   centering means extending longitudinally of the inside of said coil spring means and operable to restrain said coil spring means against movement in one direction laterally of its longitudinal axis and generally outwardly of said hub, centrifugally responsive, cam means carried at one end of said centering means and slidably and cammingly engaging said clutch shoe, said centrifugally responsive cam means being movable generally outwardly of said clutch hub in response to centrifugal force and operable, in response to such outward movement, to tend to cam said clutch shoe generally outwardly of said hub, said coil spring means being operable to transmit centrifugally induced force acting on said coil spring means to said cam means and transmit said centrifugally induced force to said cam means through said centering means.

4. A clutch spring retaining member, said member comprising:
   a longitudinal body portion comprising a cylindrical segment operable to extend longitudinally through the interior of a coil clutch shoe retaining spring;
   a first, generally planar, camming surface at one end of said cylindrical segment, projecting from the concave side thereof, extending transversely of the longitudinal axis of said segment, and operable to cammingly engage a first clutch shoe surface interposed radially between a body portion of a first clutch shoe and a clutch shoe hub;
   a second, generally planar, camming surface at another end of said cylindrical segment projecting from the concave side thereof and extending transversely of the longitudinal cylindrical axis of said segment and operable to cammingly engage a second clutch shoe surface interposed radially between a body portion of a second clutch shoe and said clutch shoe hub;
   said first and second camming surfaces being mutually inclined, intersecting said longitudinal axis of said segment, and diverging away from the concave side of said cylindrical segment.

5. A centrifugal clutch comprising:
   a drive shaft;
   a driven member including a cylindrical portion coaxial with said drive shaft;
   a clutch assembly carried by said drive shaft means and comprising:
      at least two clutch shoes positioned on diametrically opposite sides of said drive shaft axis,
      each of said clutch shoes having a pair of camming surfaces spaced on opposite sides of a radial plane of said drive shaft extending through a general midportion of said shoe, said camming surfaces being generally diverging away from said shoe and generally facing said drive shaft axis and parallel thereto, and
      a pair of parallel, coil springs disposed on opposite sides of said drive shaft and engaging said diametrically opposite clutch shoes to resist movement of said shoes radially outwardly from said drive shaft; and
   a coil spring retaining member disposed longitudinally within each coil spring, each said member including:
      a cylindrical portion having a convex face in nested, curvature conforming engagement with the inside of said spring on a side of said spring adjacent said drive shaft, with said convex face having a radius of curvature substantially the same as half the inner diameter of said spring;
      a first generally planar camming surface in parallel slidable, camming engagement with one camming surface of one clutch shoe; and
      a second generally planar camming surface in parallel, slidable camming engagement with one camming surface of another clutch shoe positioned diametrically opposite said one shoe;
      said camming surfaces of said clutch shoes engaged by said camming surfaces of said member being disposed generally radially outwardly of their respectively associated member camming surfaces; and
      said camming surfaces of said clutch shoes engaging said member on its radially outward side with said coil spring engaging said member on its radially inward side.

6. A centrifugal clutch comprising:
   a driven, clutch hub;
   a first and second clutch shoe, each movable outwardly of said hub in response to centrifugal force;
   clutch shoe restraining, coil spring means interconnecting said first and second clutch shoes and yieldably urging said first and second clutch shoes toward said hub;
   coil spring, deflection preventing means engaging the inside of said coil spring means to restrain said coil spring means against median deflection outwardly of said hub; and
   holding means yieldably urging said coil spring, deflection preventing means toward said hub and into engagement with the inside of said coil spring while said coil spring is at rest;
   the longitudinal axis of said coil spring means extending transversely of and intersecting a plane aligned with the axis of rotation of said clutch hub.

7. A centrifugal clutch comprising:
   a driven, clutch hub;
   a first and second clutch shoe, each movable outwardly of said hub in response to centrifugal force;
   clutch shoe restraining, coil spring means interconnecting said first and second clutch shoes and yieldably urging said first and second clutch shoes toward said hub;
   coil spring, deflection preventing means engaging the inside of said coil spring means to restrain said coil spring means against median deflection outwardly of said hub;
   holding means yieldably urging said coil spring, deflection preventing means toward said hub and into engagement with the inside of said coil spring while said coil spring is at rest;
   the longitudinal axis of said coil spring means extending transversely of and intersecting a plane aligned with the axis of rotation of said clutch hub;
   said coil spring deflection preventing means including an arcuate surface in conforming engagement with the inside of each coil of said coil spring means; and
   said holding means comprising cam means operable to transmit centrifugal force acting on said coil spring means to each of said first and second clutch shoes, with said thus transmitted centrifugally induced force tending to move each of said first and second clutch shoes outwardly of said clutch hub.

References Cited

UNITED STATES PATENTS

| 2,101,946 | 12/1937 | Jonsson | 192—105 |
| 2,396,637 | 3/1946 | Bruestle. | |
| 2,452,111 | 10/1948 | Eaton. | |
| 2,596,193 | 5/1952 | Zieg. | |
| 2,626,033 | 1/1953 | Lewis et al. | |

BENJAMIN W. WYCHE, III, *Primary Examiner.*